Figure 1:
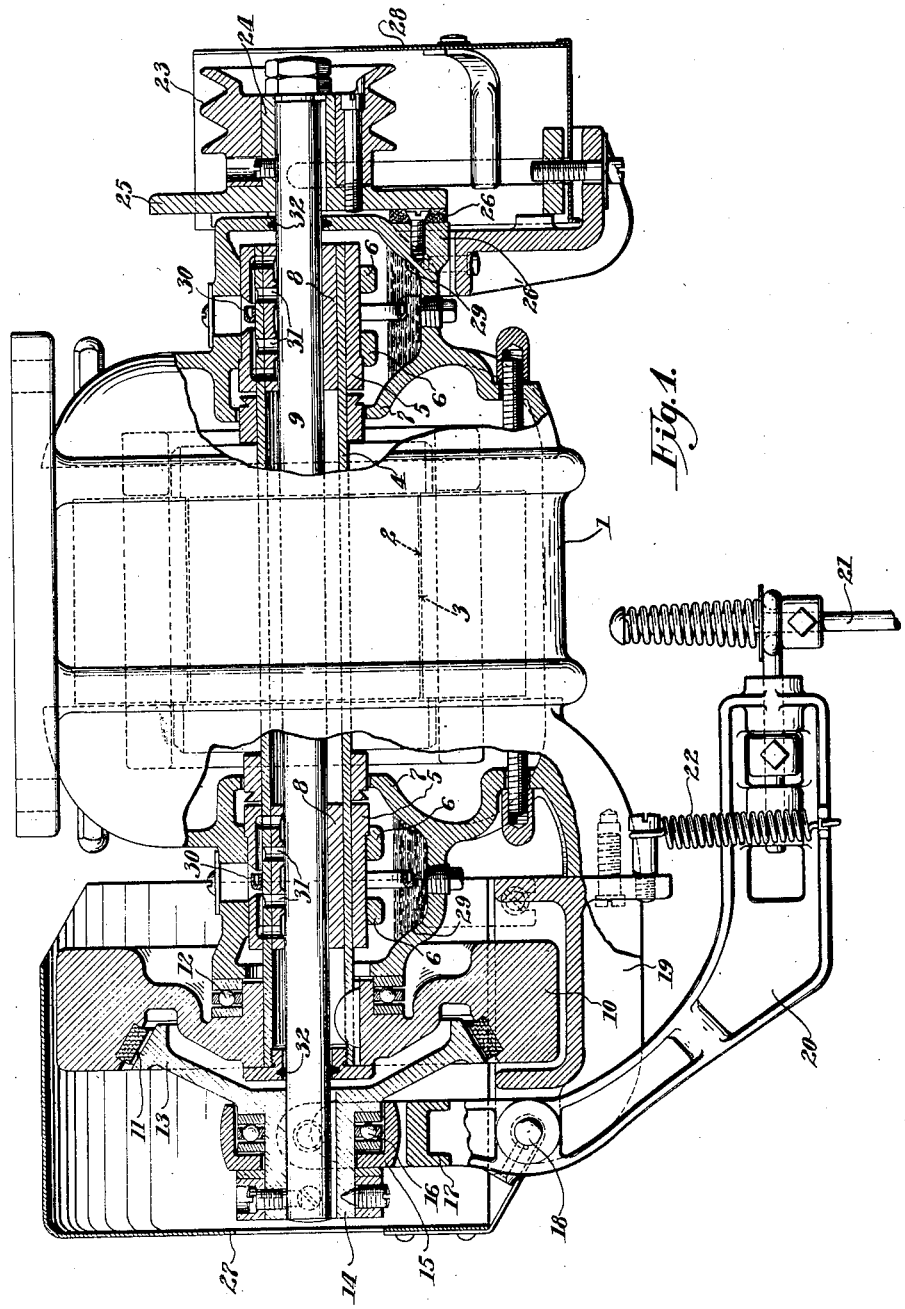

Nov. 24, 1925.

I. F. WEBB 1,562,668

ELECTRIC POWER TRANSMITTER

Filed Sept. 18, 1924    2 Sheets-Sheet 1

INVENTOR
Irving F. Webb
BY
Henry J. Miller
ATTORNEY

WITNESSES

Nov. 24, 1925.

I. F. WEBB 1,562,668

ELECTRIC POWER TRANSMITTER

Filed Sept. 18, 1924    2 Sheets-Sheet 2

WITNESSES

INVENTOR
Irving F. Webb
BY
ATTORNEY

Patented Nov. 24, 1925.

1,562,668

UNITED STATES PATENT OFFICE.

IRVING F. WEBB, OF ELIZABETH, NEW JERSEY, ASSIGNOR TO THE SINGER MANUFACTURING COMPANY, OF ELIZABETH, NEW JERSEY, A CORPORATION OF NEW JERSEY.

ELECTRIC-POWER TRANSMITTER.

Application filed September 18, 1924. Serial No. 738,352.

*To all whom it may concern:*

Be it known that I, IRVING F. WEBB, a citizen of the United States, residing at Elizabeth, in the county of Union and State of New Jersey, have invented certain new and useful Improvements in Electric-Power Transmitters, of which the following is a specification, reference being had therein to the accompanying drawings.

This invention relates to electric power-transmitters of the type adapted more particularly for driving sewing machines. It has for an object to provide an electric driving unit embodying a friction clutch, the elements of which are so journaled that their initial accurately-centered relation will be maintained for a long period of use, thus insuring freedom from the screeching noises incident to the operation of inaccurately centered clutch-elements.

Another object of the invention is to provide an electric driving unit, the bearings for the rotary elements of which are so arranged that they may be lubricated automatically, as by ring oilers, and without danger of oil leaking beyond the confines of such bearings and being thrown onto the clutch and pulley elements and the surroundings in general.

According to the present invention, the motor is formed with a tubular power-shaft extending entirely through the motor-frame. A driven shaft is journaled within the tubular power-shaft and has its opposite ends extended beyond the corresponding ends of the latter. A fly-wheel having a friction clutch face is mounted on one end of the tubular power-shaft and a mating driven clutch-member is mounted on the corresponding end of the driven shaft. A belt-pulley and brake-flange are mounted preferably on the opposite end of the driven shaft; one or more brake-shoes being mounted on the motor-frame for engagement by the brake-flange. A manually controlled lever is connected to the driven shaft to impart endwise clutching and de-clutching movements to the latter.

The tubular power-shaft is journaled in bearing bushings supported in hollow bearing housings at the opposite ends of the motor-frame and ring oilers are preferably provided to run on such shaft. Ducts leading from the exterior to the bearings within the tubular shaft are provided to insure lubrication of the driven shaft. The driven shaft emerges at its opposite ends through oil wipers which prevent escape of oil from the bearing housings to the clutch and brake elements.

Figure 3:
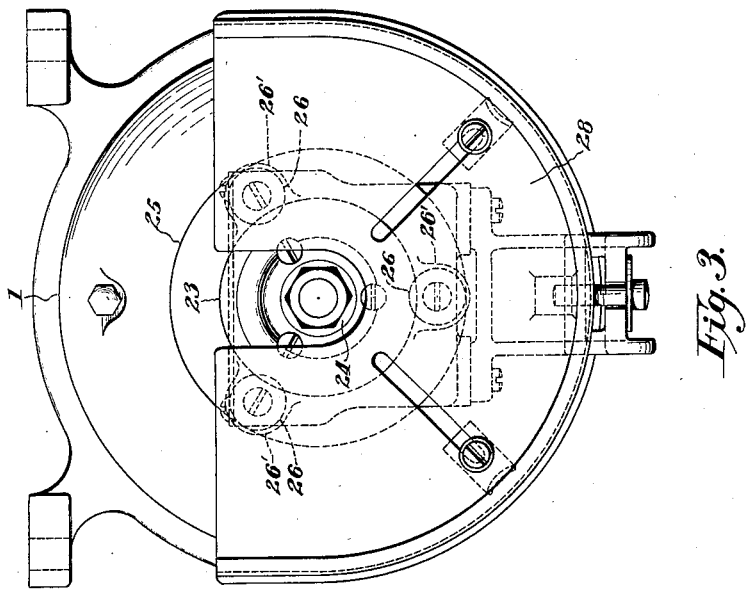
Figure 2:
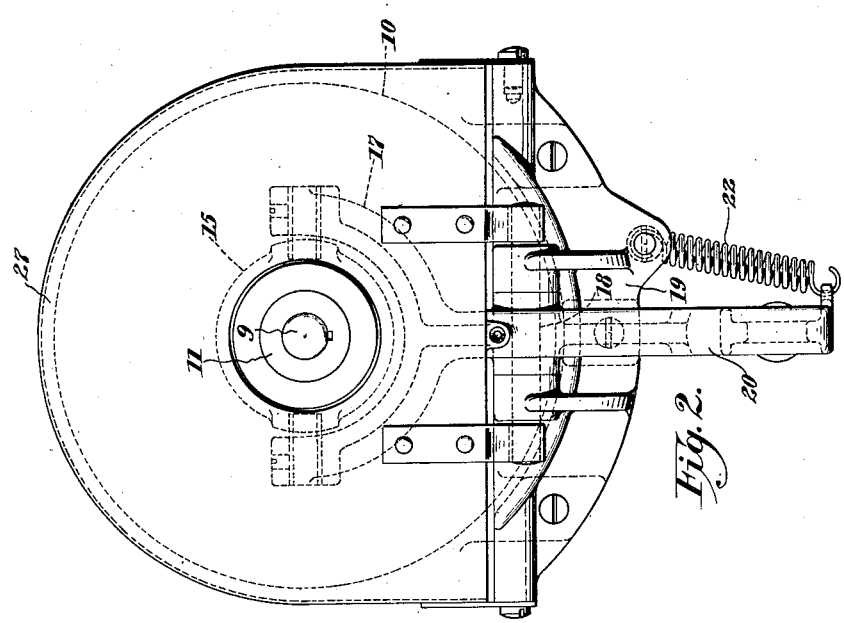

In the accompanying drawings, Fig. 1 is a longitudinal vertical section through an electric power-transmitter embodying the invention. Fig. 2 is a left end-elevation and Fig. 3 a right end-elevation of the transmitter shown in Fig. 1.

In the preferred embodiment of the invention, as illustrated, 1 represents the hollow cylindrical motor-frame within which are the usual magnetically coacting stationary and rotary motor-elements 2, 3, the latter of which is fixed to the tubular motor-shaft 4 which is journaled in the bearing bushings 5, 5, supported by the webs 6, 6 cast within the bearing housings 7. In the present embodiment, the motor-elements 2, 3 are, respectively, the usual stator and rotor elements of a squirrel-cage induction motor. The particular type of motor elements is, however, immaterial to the invention. The sleeve-shaft 4 has fixed within its ends the bearing bushings 8 for the driven shaft 9, the opposite ends of which extend beyond the corresponding ends of the sleeve-shaft 4.

Fixed to one end of the sleeve-shaft 4 is the fly-wheel 10 having a conical friction clutch-ring 11, say of leather; a thrust bearing 12 being interposed between the fly-wheel and the motor-frame. The driven clutch-element 13, which mates with the driving clutch-element 10, is formed with a hub 14 fixed to the driven shaft 9 and surrounded by a ring-member 15 enclosing a thrust-bearing 16. The ring-member 15 is connected to the forked upper arm 17 of a manually operated elbow-lever fulcrumed at 18 to the motor-frame extension 19. The lateral arm 20 of such lever is connected to the usual treadle-rod 21 and preferably has a spring connection 22 to the motor-frame.

The belt-pulley 23 is fixed to the hub 24 of the brake-flange 25 secured to the end of the shaft 9 remote from the clutch-elements. Brake-shoes 26 are secured to suitable seats 26' cast on the motor-frame. These brake-shoes are engaged by the inner face of the brake-flange 25 under the influence of the spring 22 when the pull on the treadle-rod 21 is relieved. Suitable guards 27, 28 are placed around the clutch and pulley elements.

The bearing-housings are formed with oil-wells 29 into which dip the ring oilers 30 riding on the sleeve-shaft 4. Apertures 31 serve to conduct the oil to the bearing surfaces of shaft 9 within the shaft 4 while wiping rings 32 prevent the escape of oil to the clutch and brake surfaces.

It will be readily understood that the present construction and arrangement of parts is such that the matter of lubrication is taken care of automatically for long periods of time. Each shaft has bearings at opposite ends of the motor-frame and this insures maintenance of a true co-axial relationship of the shafts and quiet running of the friction clutch-elements for long periods without attention; the de-centering and dis-aligning effects on the shafts of bearing wear being minimized by the widely separated telescopic bearings.

Having thus set forth the nature of the invention, what I claim herein is—

1. An electric power-transmitter comprising a motor having magnetically coacting stationary and rotary motor-elements, a tubular power-shaft carrying the rotary motor-element, a driven shaft journaled within said tubular power-shaft, and a manually operated friction-clutch connection between said shafts.

2. An electric power-transmitter comprising a motor having magnetically coacting stationary and rotary motor-elements, a tubular power-shaft carrying the rotary motor-element, a driven shaft journaled within said tubular power-shaft, a manually operated friction-clutch connection between said shafts at one end of the driven shaft, and a belt-pulley and brake at the opposite end of the driven shaft.

3. An electric power-transmitter comprising a motor having a frame formed with bearing supports at its opposite ends, a tubular motor-shaft journaled in said bearing supports, a rotary and endwise movable driven shaft arranged coaxially of and journaled within said tubular motor-shaft, coacting friction clutch members mounted respectively on said tubular and driven shafts at one end of the motor-frame, a manually operated lever fulcrumed on the motor-frame and connected to move the driven shaft endwise, and a belt-pulley fixed to said driven shaft.

4. An electric power-transmitter comprising a motor having magnetically coacting stationary and rotary elements, a frame, and a tubular power-shaft carrying said rotary motor element and journaled at its opposite ends in said frame, a driven shaft extending through the motor-frame and journaled in said tubular power-shaft, mating friction clutch-elements carried by said shafts at one end of the motor-frame, and a belt pulley fixed to the driven shaft at the other end of the motor-frame.

5. An electric power-transmitter comprising a motor having a frame formed with oil-well bearing housings at its opposite ends, a tubular motor-shaft journaled within said bearing housings, a driven-shaft having bearings within the motor-shaft and the space enclosed by said bearing housings, ring-oilers riding on the tubular motor-shaft, said tubular motor-shaft being formed with apertures to convey the lubricant to the bearings for the driven shaft, driving and driven clutch-members mounted respectively on said tubular and driven shafts, a belt-pulley fixed to the driven shaft, and manually operated means for establishing and interrupting driving relationship between said clutch-members.

In testimony whereof I have signed my name to this specification.

IRVING F. WEBB.